Jan. 15, 1952 R. S. ARIES 2,582,737
BRAKE AND HANDLE ARRANGEMENT FOR BABY CARRIAGES
Filed Feb. 18, 1948 2 SHEETS—SHEET 1
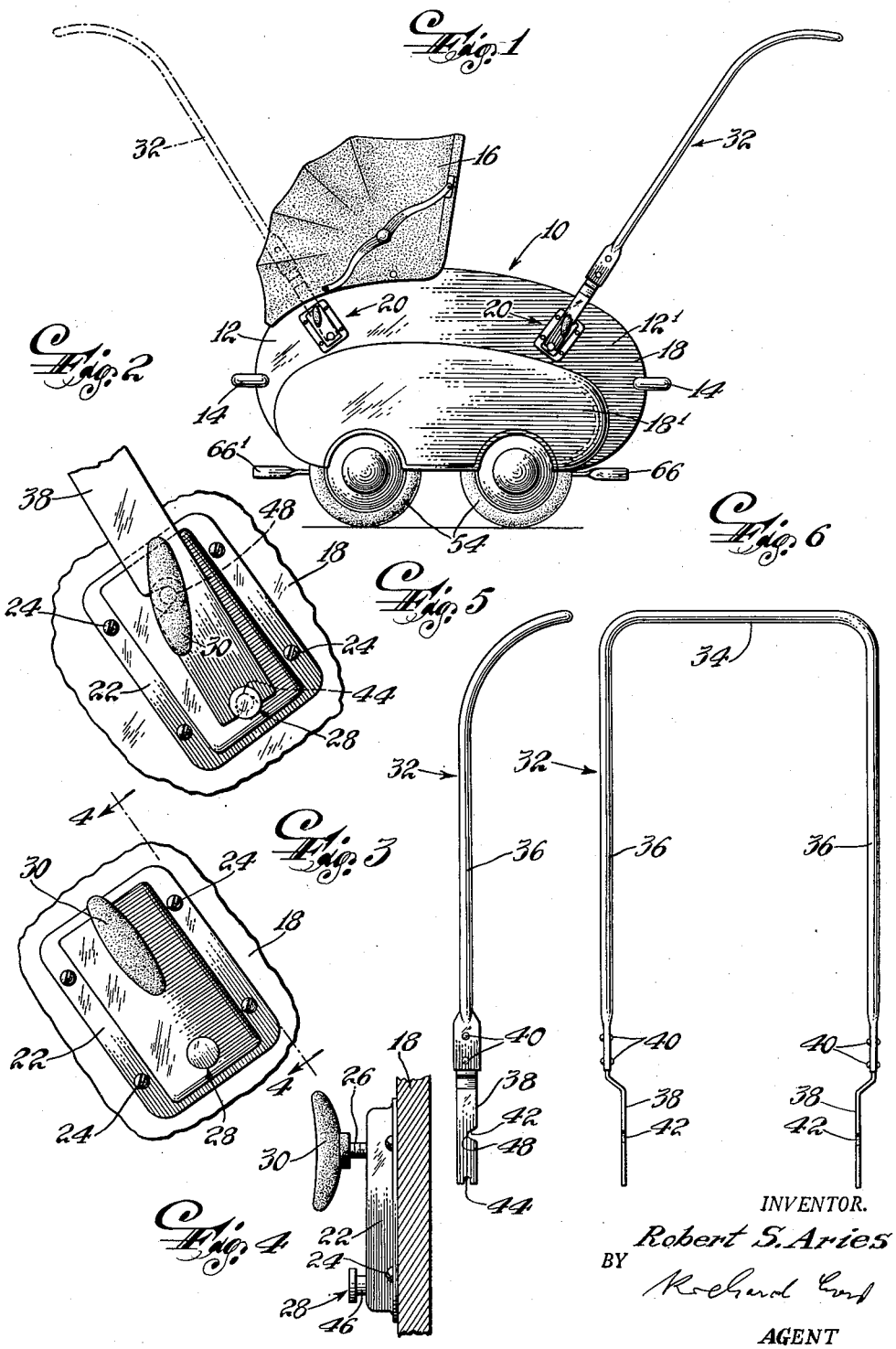
INVENTOR.
Robert S. Aries
BY
Richard Guy
AGENT

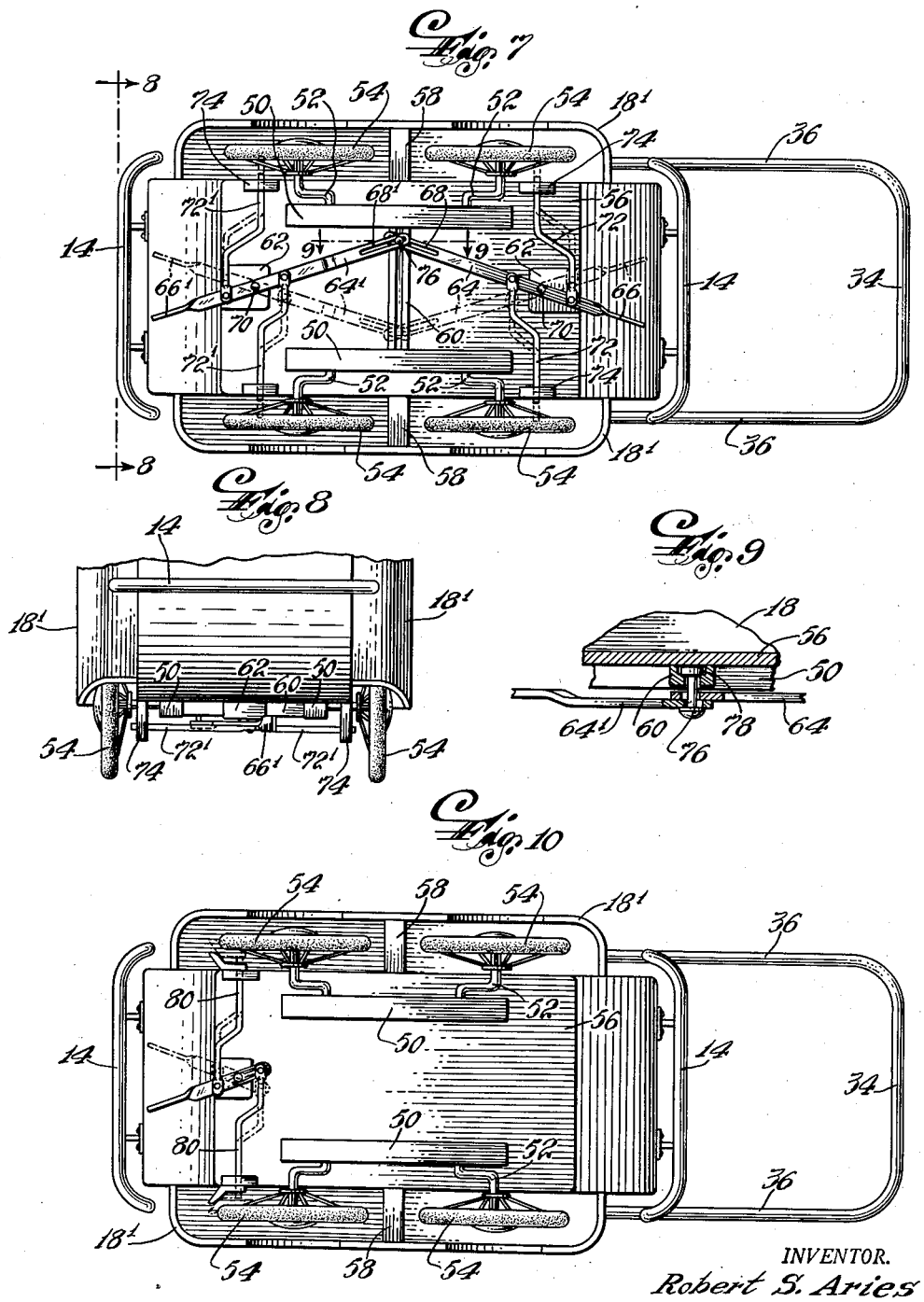

UNITED STATES PATENT OFFICE 2,582,737

BRAKE AND HANDLE ARRANGEMENT FOR BABY CARRIAGES

Robert S. Aries, New York, N. Y.

Application February 18, 1948, Serial No. 9,071

2 Claims. (Cl. 280—47)

This invention relates to carriages and more particularly children's and toy carriages.

The primary object of my invention is to generally improve baby, toy and similar carriages.

As well understood, most baby carriages have the disadvantage that they cannot be pushed from either end. One object of my invention is, therefore, to provide a baby carriage whereby the wheeling can be effected from either end. A carriage of this improved type makes turning on a sidewalk easy and makes it possible that the child in the carriage, without a change in its position, be wheeled either forward or backward.

It has already been suggested to provide the handle of a baby carriage with guiding members to slide the handle along bars extending lengthwise of the carriage, but this suggestion did not prove satisfactory because of the complicated sliding mechanism. Other suggestions aiming at a detachable handle to be used at either end of a baby carriage made provisions for the handle to be connected either to the frame or springs of the carriage. These suggestions were not satisfactory because of inadequate bearing surfaces of the assembled parts. Special provisions had to be made either for a substantial extent of the adjacent surfaces of the assembled parts or for tie rods to hold the parts securely together. One of the main objects of my present invention centers about the provision of a handle attaching mechanism which is simple and sturdy in construction, inexpensive to manufacture, and permits the handle to be easily and tightly secured to either end of the carriage.

Another object of this invention is to provide a baby carriage which looks attractive and the body of which is designed so as to make its cleaning easy. The present invention aims at a baby carriage of a modern outward look, but at the same time at a design which helps simplify the handle attaching mechanism and minimizes the difference between wheeling the carriage forward and wheeling it backward.

It is customary to equip baby carriages with a brake. Most of such prior brakes are operated by the foot of the attendant, with the attendant necessarily standing at the end of the carriage from which propulsion is effected. One object of my invention is to provide a brake mechanism for baby carriages to be operated by the foot of the attendant, and a more specific object is to provide a brake which permits its application from either end of the carriage.

To the accomplishment of the foregoing and other objects which will hereinafter appear, my invention consists in the elements of a baby or similar carriage and their relation one to the other, as hereinafter are more particularly described in the specification and sought to be defined in the claims. The specification is accompanied by drawings in which:

Fig. 1 is a side elevation of a baby carriage embodying features of my invention;

Fig. 2 is an enlarged view in elevation illustrating the handle attaching mechanism;

Fig. 3 illustrates a part of the handle attaching mechanism of Fig. 2;

Fig. 4 is a view of the part of Fig. 3 in the direction of the arrows 4 in Fig. 3;

Fig. 5 is an elevation of the handle;

Fig. 6 is a plan view of same;

Fig. 7 is a bottom view of the carriage, illustrating the brake mechanism according to the invention;

Fig. 8 is a fragmentary view in elevation in the direction of the arrows 8 in Fig. 7;

Fig. 9 is a detail view in section taken on the line 9—9 of Fig. 8; and

Fig. 10 illustrates a modified brake mechanism in a fragmentary bottom view.

Referring to the drawings and more particularly Figs. 1 through 6, a solid body 10 of the carriage is designed to have even and uninterrupted outer surfaces. All elevations and depressions in the outer surfaces are avoided. In addition to the streamline form thus given to the body of my carriage, the body has ends 12 and 12' which are similar in appearance to make the carriage appear as if it had no front and rear. The body carries a bumper 14 at each end. The folding top 16 is of conventional design. Special importance is attached to the fact that the sides 18 of the body are solid, and to the brackets 20 secured to these solid body sides. A fenderlike formation 18' on each side 18, together with the streamline form of the body and the overall low construction of the carriage, gives the carriage a modern look. There are four identical brackets 20, two being on opposite sides at each end of the body. Each bracket comprises a plate 22 (see Figs. 2 to 4) fixed to a side wall 18, for instance, by screwing at 24. Secured to each plate 22 is a screw bolt 26 and a stud 28. The bolt 26 is engaged by a winged nut 30. The push handle 32, as can be seen in Fig. 6, consists of a crossbar 34 and two longitudinal bars 36. In the embodiment selected for illustration, there are two flat extensions 38 formed as offsets of, and riveted at 40 to, the bars 36. Each of these flat extensions, which could be integral with the respective bar 36 as well, is provided, as can best be seen in Figs. 2 and 5, with a notch 42 in one side edge and a slot 44 at the end.

The handle 30 is fixed at either end of the carriage by placing the free ends of the extensions 38 within the two brackets 20 at one of the ends of the carriage. This is done by first taking care that the shanks 46 of the studs 28 be received in the slots 44, and by then moving the handle, the shanks 46 thereby using as a pivot, until the bolts 26 bear against the roots 48 of the notches 42. When in this position, the handle is secured in place simply by tightening the nuts 30.

It will be noted that the carriage of my invention, in being provided with low wheels, is intended to have a low center of gravity, and it will be readily understood that such a low-wheel type carriage affords the possibility of attaching the removable handle to the body of the carriage, thus permitting the use of simple connecting means. The flat extensions 38 bear against the plates 22 and ensure a tight and safe connection, both the extensions and plates having extended bearing surfaces. In Fig. 1, the handle is shown attached at the right end of the carriage (solid lines), whereas the dash-dotted line position at the left indicates the possible attachment at the other end of the carriage.

Referring now to Figs. 7 through 9, secured in two blocks 50 are axles 52 on which are journaled wheels 54. The blocks 50 support the bottom 56 of the body 10, the bottom 56 in turn supporting by means of crosspieces 58 the fenders 18'. The manner of supporting the wheels may, of course, be varied in a large number of known ways. Neither of these ways nor the mounting of the body form features of this invention. Fixed to the under side of the bottom 56 are a crossbar 60 and two blocks 62. There are two levers 64 and 64' terminating in a treadle 66 and 66', respectively, at one end and having a long slot 68 and 68', respectively, at the other end. Each of the levers 64, 64' is pivoted intermediate of its ends, at 70, to a block 62. Two arms 72 are connected with the lever 64, and two arms 72' with the lever 64', each of the arms 72 and 72' being guided in a guide block 74. The levers 64 and 64' are hinged to each other by means of a pin 76, the latter being slidably received in a depression 78 in the crossbar 60, as shown in Fig. 9.

Considering first the solid line position of the lever 64, it will be clear that the free ends of the arms 72 are in inoperative position, that is, they do not check in any way the movement of the carriage. By actuating the treadle 66 and swinging the lever 64 into its dash-dotted line position, the free end portions of both arms 72 will project between the spokes of the two respective wheels, thus locking the wheels and preventing the carriage from accidentally rolling.

I will now call attention to what I esteem important. This is the fact that the brake of my invention can be operated from either end of the carriage. Considering again the solid line position of the lever 64, it will now be apparent that while swinging this lever into the dash-dotted position, the lever 64' moves simultaneously from its solid line into its dash-dotted line position, the pin 76 thereby sliding from one end of the crossbar 60 to the other end. It will also be clear that this swinging movement of the lever 64' brings the free end portions of the arms 72' from their inoperative to the operative position, thus also locking the left-hand wheels. The brake may be applied and released from either end of the carriage.

The manner of designing the brake of my invention as to its details of construction and mounting may be varied without, however, departing from the principle of construction and operation. The designs will necessarily vary with the different makes of brakes that exist, and must be adapted to suit the constructions already employed.

It should be noted that the brake mechanism shown in Figs. 7 through 9 may be modified by omitting one pair of the two pairs of brake arms 72, 72'. In this modification, the brake will again be actuated from either end of the carriage, but only two wheels instead of four, as explained hereinbefore, will be locked. In another modification, only a single brake arm is provided to be applied to one wheel only, the brake to be again actuated from either end of the carriage.

In Fig. 10, a further modification of the brake of my invention is shown. The arms 80 are not designed to project between the spokes of the wheels, when in operative position, but engage the rims of the wheels or the tires attached to the rims. The treadle at one end may be linked up with the treadle at the other end through the same mechanism as shown in Figs. 7 to 9 or through any other suitable mechanism. While the linkage of Figs. 7 to 9 is particularly simple and in itself forms a feature of my invention, other systems of links may also be employed.

It is believed that the construction and operation of a preferred form of elements of a baby carriage for practicing the invention, and the many advantages thereof, will be understood from the foregoing detailed description thereof. It will be clear that the streamline form of the body of my carriage makes cleaning easy and is sanitary. The particular design of the body does not show markedly different ends. The attaching mechanism for the detachable handle is simple and tight and avoids rattling. This handle attaching mechanism is made possible by the solid and low-wheel construction of the body. The person attending my new carriage is in a position to apply the brake from whatever end he pushes the carriage. The latter advantage is regarded highly because the handle and brake according to my invention represent two mutually completing features. All of the new parts and features referred to in connection with baby carriages hereinbefore may also be applied on similar carriages, such as, for instance, toy carriages; the term "baby carriage" is not used here in a limiting sense, but is meant to include baby, toy and similar carriages.

It will be apparent that while I have shown and described my invention in a preferred form, many changes and modifications may be made without departing from the spirit of the invention defined in the following claims.

I claim:

1. Baby carriage comprising a body provided with handle-receiving structures at each end of the body, whereby a propellant handle can be attached to either end of the carriage, and a brake mounted on said body, the brake including two levers extending substantially longitudinally of the carriage in end to end relation, each lever being pivoted around a point intermediate of its ends and terminating in a treadle at its outer end, the levers being pivoted to each other at their inner ends, the pivot of the levers being slidably arranged along a horizontal line transversally of the carriage, at least one lever having connected thereto at least one brake arm adapted for movement to and from its operative position.

2. In the carriage according to claim 1, at least one lever having connected thereto two brake arms extending in opposite directions, so that actuation of any one of the treadles moves both brake arms simultaneously to or from their operative positions.

ROBERT S. ARIES.

REFERENCES CITED

The following references are of record in the file of this patent:

UNITED STATES PATENTS

| Number | Name | Date |
|---|---|---|
| 870,739 | McIntyre | Nov. 12, 1907 |
| 968,763 | Goldstein | Aug. 30, 1910 |
| 1,042,193 | Bowling | Oct. 22, 1912 |
| 1,093,322 | Foyer | Apr. 14, 1914 |
| 1,170,687 | Shaw | Feb. 8, 1916 |
| 1,507,955 | Dann et al. | Sept. 9, 1924 |
| 2,254,632 | Teska | Sept. 2, 1941 |
| 2,420,412 | Boudreau | May 13, 1947 |
| 2,474,804 | Schwarzbaum | June 28, 1949 |

FOREIGN PATENTS

| Number | Country | Date |
|---|---|---|
| 178,718 | Switzerland | Oct. 16, 1935 |
| 184,113 | Great Britain | Aug. 10, 1922 |